March 3, 1970     C. H. BARNES     3,498,487
REFUSE COLLECTION VEHICLE
Filed July 5, 1968     3 Sheets-Sheet 1
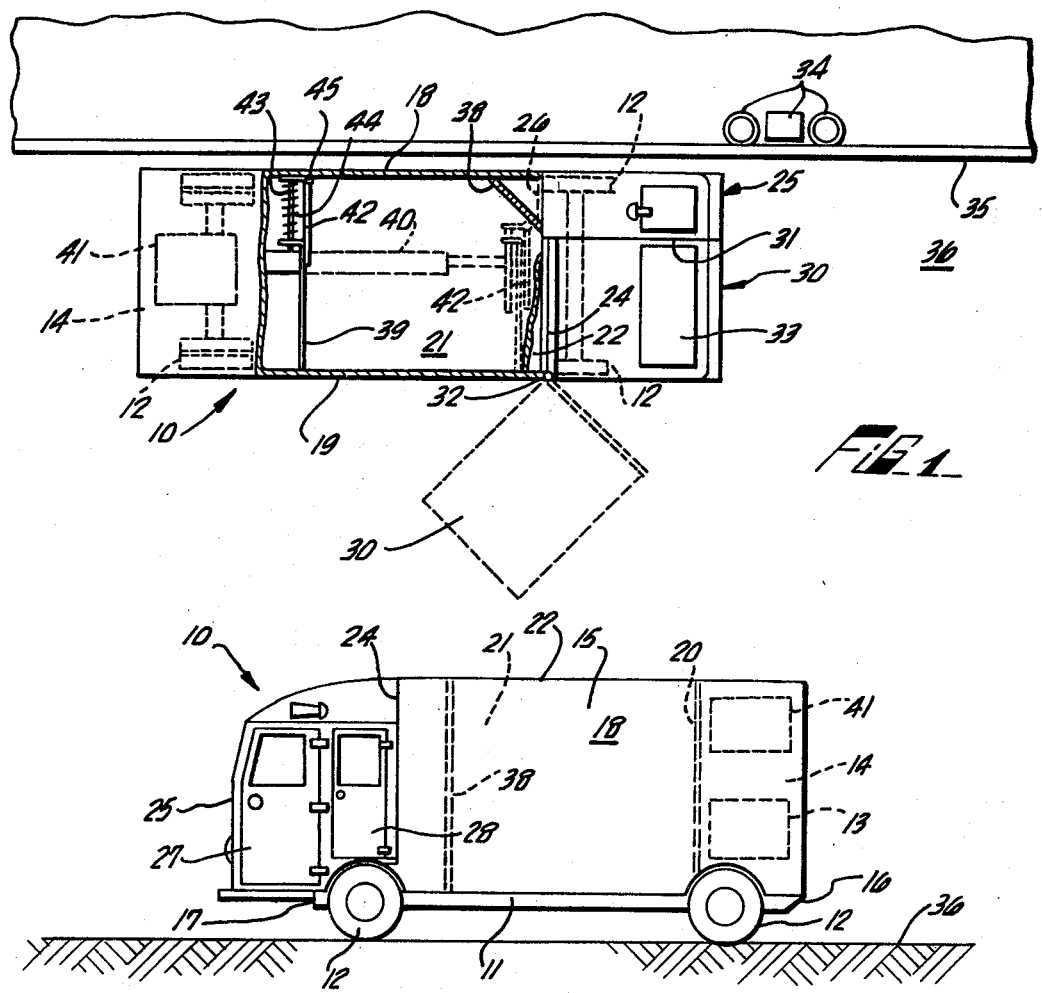
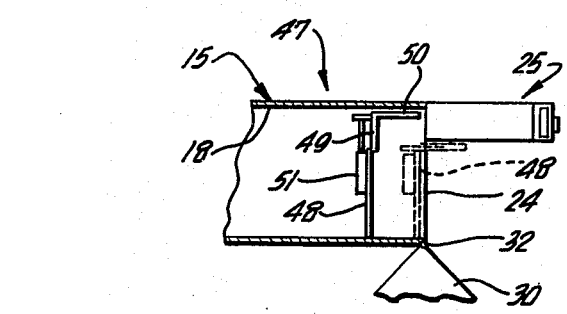
INVENTOR.
CHARLES H. BARNES
BY
Christie, Parker & Hale
ATTORNEYS.

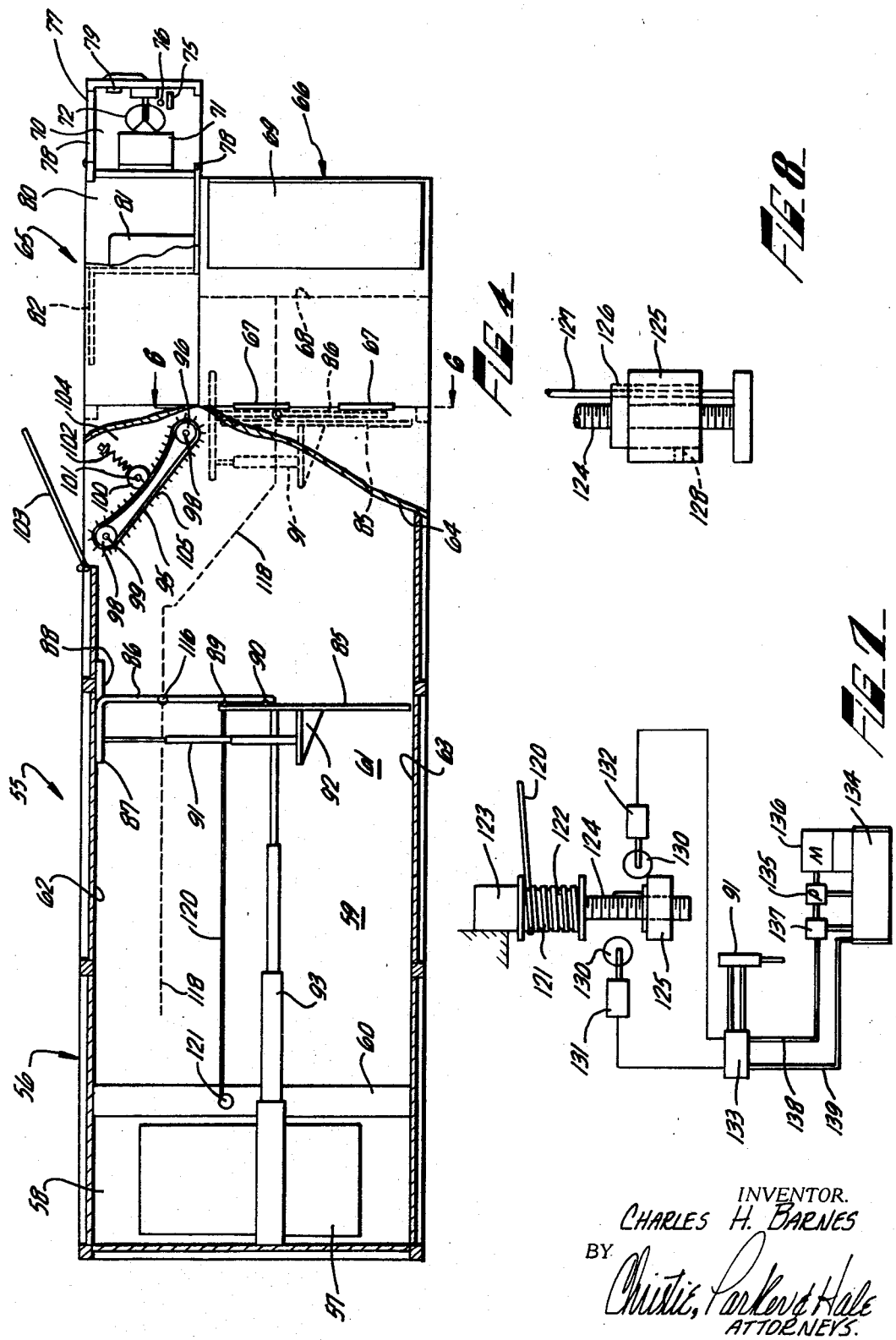

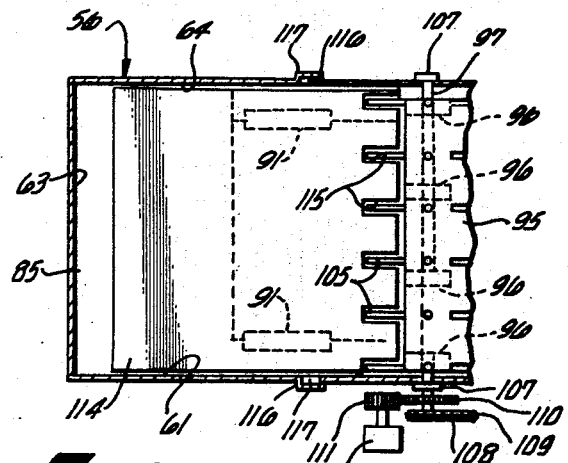
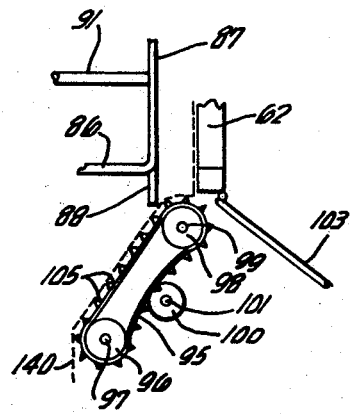
FIG. 6
FIG. 5
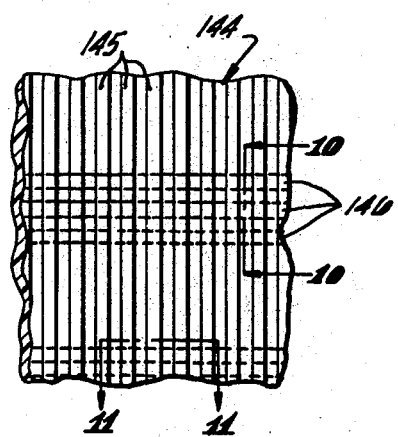
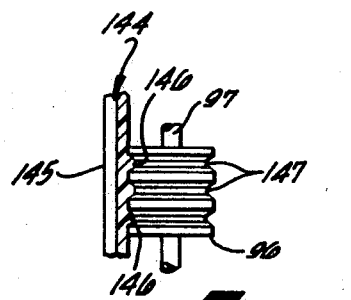
FIG. 9
FIG. 10
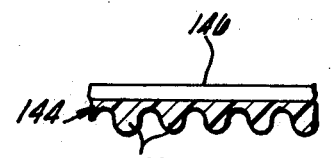
FIG. 11
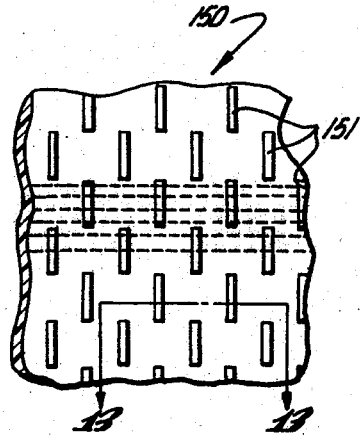
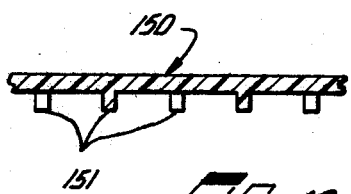
FIG. 12
FIG. 13
INVENTOR.
CHARLES H. BARNES
BY
Christie, Parker & Hale
ATTORNEYS.

United States Patent Office 3,498,487
Patented Mar. 3, 1970

3,498,487
REFUSE COLLECTION VEHICLE
Charles H. Barnes, 2766 E. Glenoaks Blvd.,
Glendale, Calif. 91206
Continuation-in-part of application Ser. No. 501,412,
Oct. 22, 1965, which is a continuation-in-part of
application Ser. No. 284,958, June 3, 1963. This
application July 5, 1968, Ser. No. 742,877
Int. Cl. B60f 3/00; B60p 1/00
U.S. Cl. 214—518                                    20 Claims

ABSTRACT OF THE DISCLOSURE

A refuse collection vehicle in which a bin is mounted to a self-propelled wheeled chassis to define essentially the maximum width of the vehicle. A control cab is fixed to the chassis adjacent one end of the bin to partially close the bin. A gate assembly is mounted adjacent the control cab for movement into and out of closure relation with the remainder of the one end of the bin. The gate assembly includes a hopper and means for transferring to the bin refuse introduced into the hopper. Refuse ejection means are provided within the bin for ejecting collected refuse from the bin through the opening provided when the gate assembly is moved out of closure relation to the remainder portion of the bin one end.

CROSS-REFERENCE TO RELATED APPLICATIONS

This application is a continuation-in-part of copending application Ser. No. 501,412, filed Oct. 22, 1965 (now Patent 3,391,811) which was a continuation-in-part of application Ser. No. 284,958, filed June 3, 1963 (now Patent 3,233,765).

BACKGROUND OF THE INVENTION

Field of the invention

This invention pertains to refuse collection vehicles and, more particularly, to refuse collection vehicles incorporating improved operational and refuse ejection characteristics.

Review of the prior art

The structures of existing refuse collection vehicles have been predicated upon the configuration of conventional truck bodies. The methods of operation of such vehicles have been dependent upon methods of operation of conventional trucks in that the refuse collecting, compacting and storing devices thereof are built around conventional truck chassis. These trucks have a single and fixed control station at the forward end of the vehicle which is used to control the vehicle both in transit from the garage or parking yard to the refuse collecting route and upon the refuse collecting route. These vehicles require a driver and one or more refuse loaders, the latter being referred to in the trade as "swampers," as personnel of a refuse truck crew. It is especially on routes for collection of refuse in residential areas that the practices of operation of prior refuse collecting vehicles are inefficient. This is true since the driver works only while the swampers are idle, and the swampers load the vehicle while the driver waits to drive the vehicle to the next pick-up station. Most commonly, the vehicle is loaded through a hopper located in a movable gate assembly disposed across the rear of a refuse storage bin mounted to the chassis of the vehicle. Where the driver doubles as a swamper, at each refuse collection station the driver must climb out of the vehicle, walk from the cab to the refuse hopper at the rear of the vehicle, perform whatever refuse loading operations are required at the rear of the vehicle, and then walk back to the cab to drive the vehicle to the next refuse collecting station.

In attempting to improve the operational efficiency of such vehicles, some refuse collection vehicles have been provided with auxiliary control stations on the running board of a conventional cab on the curb side of the vehicle. Such modified vehicles still require that the driver walk from the refuse hopper to the auxiliary control station at the forward end of the vehicle in order to drive the vehicle between refuse pick-up stops.

My prior Patent 3,233,765 provides improvements over the vehicles described above in the form of an auxiliary control station which may be added to the structure of an existing refuse collection vehicle at the rear of the vehicle adjacent the refuse collection hopper. On a collection route, the vehicle may be operated in a reverse mode from the auxiliary control station which includes steering, accelerator, brake and associated controls for the vehicle. The driver of the vehicle can function efficiently as a swamper and may be the only member of the vehicle crew.

My prior Patent 3,391,811 pertains to an improved refuse collection vehicle in which the control station is located adjacent the hopper and is the only control station for the vehicle.

In conventional refuse collecting vehicles of the type which include a gate assembly incorporating a hopper and a refuse transfer mechanism, the gate assembly extends across the entire width of the vehicle and is movable into and out of closure relation ot the bin. In such vehicles, ejection of refuse from the bin is a simple matter inasmuch as one entire end of the bin is opened when the gate assembly is moved out of closure relation to the end of the bin through which refuse ejection takes place.

My prior Patent 3,391,811 and German Auslegeschrift 1,022,156 describe refuse collection vehicles in which the gate assembly includes both the only control station for the vehicle and the refuse collection hopper and refuse transfer mechanism; in such vehicles, steering control signals must be transferred from the cab to the steering wheels of the vehicle at least in part by hydraulic or pneumatic systems rather than by a positive mechanical linkage between the steering wheel and the steerable wheels, thereby presenting a danger that the vehicle cannot be controlled if the hydraulic or pneumatic system should become damaged or otherwise rendered inoperative during movement of the vehicle. For this reason, it is desirable that the sole control station for the vehicle be mounted in a fixed relation to the vehicle chassis. It is because of these considerations that the inefficient configuration of existing vehicles first described above has persisted and is, in fact, well established. It will also be appreciated that where the sole vehicle control station is permanently fixed to the vehicle chassis and partially closes that end of the bin through which refuse is ejected at the completion of a refuse collection run of the vehicle, difficulties in ejection of collected refuse may be expected; alternatively, in order that conventional refuse ejection techniques may be used, it is necessary that the volume of the bin lying directly behind the control cab be sacrificed.

SUMMARY OF THE INVENTION

This invention provides an improved refuse collection vehicle in which a control cab is fixed to a vehicle chassis adjacent a gate assembly at one end of the refuse collection bin. The cab and gate assembly cooperate to close the end of the bin, the gate assembly being movable into and out of closure relation with that portion of the bin which is not closed permanently by the presence of the control cab. More particularly, in this context the present invention provides improved refuse ejection mechanisms which permit maximum use of the interior volume of the bin. The refuse collecting and storing capacity of the portion of the bin which lies directly rearwardly of the control cab is not sacrificed.

Generally speaking, this invention provides a refuse collection vehicle which includes a self-propelled wheeled chassis and a refuse collection bin mounted to the chassis. The bin defines essentially the maximum width of the vehicle and has opposite ends, one of which is effectively permanently closed. A vehicle control cab is fixedly and permanently mounted to the chassis adjacent the other end of the bin proximate to one side of the vehicle. The control cab partially closes the other end of the bin. A gate assembly is mounted adjacent the control cab for movement into and out of closure relation to the remainder of the other end of the bin. The gate assembly includes a refuse collection hopper and means for transferring to the bin refuse introduced into the hopper.

Viewed in another light, this invention provides a refuse collection vehicle in which a refuse collection bin, mounted to a self-propelled wheeled chassis, has opposite ends and interior effective boundary surfaces including a floor and side walls. A vehicle control cab is fixedly mounted to the chassis adjacent one end of the bin and partially permanently closes one end of the bin. A refuse collection hopper assembly, together with means for transferring into the bin refuse introduced into the hopper, is mounted adjacent the control cab for closing the remainder of the one end of the bin. The vehicle incorporates means for ejecting from the bin refuse collected therein. The ejecting means includes a movable belt which defines at least a part of one of the interior boundary surfaces of the bin.

DESCRIPTION OF THE DRAWINGS

The above-mentioned and other features of this invention are more fully set forth in the following detailed description of the presently preferred embodiments of the invention, such description being presented with reference to the accompanying drawings, wherein:

FIG. 1 is a top plan view of a refuse collection vehicle according to this invention;

FIG. 2 is a left side elevation view of the vehicle shown in FIG. 1;

FIG. 3 is a fragmentary plan view, with parts broken away, of another refuse collection vehicle;

FIG. 4 is a top view, with parts broken away, of a third refuse collection vehicle according to the invention;

FIG. 5 is a simplified schematic view of a modification of the refuse compacting and ejecting mechanism shown in FIG. 4;

FIG. 6 is a cross-sectional view taken along line 6—6 of FIG. 4, the refuse pusher plate being shown in FIG. 6 in a position corresponding to the dotted line illustration thereof in FIG. 4;

FIG. 7 is a simplified mechanical and schematic view of a portion of a control system for the ejection mechanism in the vehicle shown in FIG. 4;

FIG. 8 is an enlarged elevation view of a portion of the structure shown in FIG. 7;

FIG. 9 is a fragmentary elevation view of a refuse transfer belt according to this invention;

FIG. 10 is a cross-sectional elevation view taken along line 10—10 of FIG. 9;

FIG. 11 is a cross-section view taken along line 11—11 of FIG. 9;

FIG. 12 is a view similar to FIG. 9 showing another belt useful with this invention; and FIG. 13 is a cross-section view taken along line 13—13 of FIG. 12.

DESCRIPTION OF THE ILLUSTRATED EMBODIMENTS

A refuse collection truck 10 (see FIGS. 1 and 2) includes a chassis 11 supported on wheels 12. An engine 13 for propelling the vehicle is mounted in a rear compartment 14 of a refuse collection and storage bin 15 mounted to the chassis. Bin 15 extends from rear end 16 of the chassis to adjacent the forward end 17 of the chassis, and has opposite sides 18 and 19 which are spaced apart essentially the maximum width of the vehicle. A partition 20 across the interior of the bin adjacent the rear of the vehicle separates compartment 14 from a larger refuse storage volume 21 of the bin. Bin 15 also preferably has a closed top 22 which extends along the entire length and width of the bin.

Bin 15 has a front end 24. A vehicle control cab 25 is mounted to chassis 11 adjacent the bin front end inwardly of the vehicle from its left side 18. Cab 25 has a rear wall 26 which permanently closes a portion of the width of the bin front end across the entire height of the bin to the rear of the cab. The cab includes access door 27 to a driver's station which is the only station from which the vehicle may be controlled for operation on the highway and the like. All steering, accelerating, braking and related control operations are performed from the driver's station in cab 23. Cab 25 also includes an access door 28, located rearwardly of driver access door 27, to a compartment in the cab within which a swamper or driver's helper may ride while the vehicle is in transit to and from refuse collection routes.

As shown in FIG. 1, the left side of cab 25 preferably is essentially coplanar with bin left side wall 18. The width of the cab transversely of the vehicle is kept as small as possible. The remaining width of the vehicle forwardly of bin front end 24 is occupied by a gate assembly 30 which is mounted for movement into and out of closure relation to that portion of the bin front end which lies to the right of cab right side wall 31. In vehicle 10, as illustrated in FIG. 1, gate assembly 30 is mounted by a vertical hinge 32 to the right front corner of the bin for hinging movement into and out of closure relation to the bin refuse discharge opening provided across the front end of the bin between the hinge and the cab. It is within the scope of this invention, however, that the gate assembly may be mounted for movement relative to the bin discharge opening about a horizontal hinge axis disposed across the top of the bin. The vehicle includes a mechanism (not shown) for driving the gate assembly into and out of closure relation to the bin refuse discharge opening.

Gate assembly 30 includes a refuse collection hopper 33 into which the contents of refuse receptacles 34 may be placed, the refuse receptacles normally being placed adjacent the curb 35 of a residential street 36 in advance of the arrival of the vehicle adjacent the receptacles. The gate assembly also includes a transfer mechanism (not shown) for moving refuse collected in hopper 33 into the interior of bin 15 through the bin refuse discharge opening when the gate assembly is disposed in closure relation to the bin. The nature of the transfer mechanism used in the gate assembly is not a part of this invention, but may be in accord with the disclosures of U.S. Patents 2,879,906 and 2,975,913, if desired.

As shown in FIG. 1, a refuse guide plate 38 is disposed in the left front corner of bin 15 immediately behind cab 25. The guide plate is inclined to the length of the vehicle from the right rear corner of the cab at an angle corresponding approximately to the angle of repose of uncompacted refuse accumulated in the bin. The guide plate extends vertically between the top and bottom interior surfaces of the bin.

Bin 15 is rigidly mounted to the chassis of vehicle 10. A refuse pusher plate 39 is mounted within bin refuse storage volume 21 for movement longitudinally of the vehicle. A suitable mechanism such as an extensible hydraulic ram 40, powered by a suitable hydraulic drive mechanism 41 located in rear bin compartment 14, is connected to the rear side of the pusher plate for moving the pusher plate back and forth along the bin. In lieu of ram 40, an endless chain drive device may be used to move the pusher plate along the bin. The pusher plate extends between the top and bottom interior surfaces of the bin and from the right interior surface of the bin toward but not to the left side of the bin. The distance between the right and left edges of the pusher plate is slightly less than the corresponding dimension of the bin refuse discharge opening. A pusher plate extension member 42 is movably mounted to the pusher plate and extends from the left side of the pusher plate to the bin left side along the vertical extent of the pusher plate. The extension member is guided in its movement laterally of the vehicle by a guide rod 43 connected between the pusher plate and its extension member on the side of the pusher plate toward compartment 14. A spring 44, or a hydraulic ram if desired, biases the extension member away from the pusher plate into engagement with the bin left side wall. The extension member at its end adjacent the bin left side wall has a rearwardly extending flange adapted to bear against the bin left side wall and to which the spring or ram is connected. A series of rollers 45 are disposed along the extension member at the forward edge of the flange to facilitate movement of the extension member transversely of the bin when such rollers bear against the rear face of the guide plate 38.

When the bin 15 is essentially empty and collection operations are begun on a refuse collection route, pusher plate 39 is disposed a short distance rearwardly of gate assembly 30. Refuse transferred into the bin from hopper 33 is compacted against the forward surface of the pusher plate and its extension member. As further refuse collection operations are carried out, the pusher plate is slowly retracted to the rear of the bin at a rate which assures maximum possible compaction of collected refuse by operation of the transfer mechanism incorporated into the gate assembly. Refuse collection operations are continued until the pusher plate is retracted to its rearwardmost position in bin 15. After the loaded vehicle has been driven from the collection route to a suitable dump or refuse disposal site, gate assembly 30 is moved out of closure relation to the bin discharge opening into the position shown in dashed lines in FIG. 1. The pusher plate is then moved forwardly of the bin to push refuse through the discharge opening. (If desired, an interlock may be provided between the gate assembly power swing mechanism and the pusher plate drive mechanism to prevent operation of the pusher plate drive mechanism in a forward mode until the gate assembly has been moved clear of the front end of the bin.) The pusher plate and its extension member move toward the front of the vehicle upon suitable guides (not shown, but see FIG. 6, for example) located in the bin. Initially the extension member is not moved relative to the pusher plate transversely of the bin. As the pusher plate approaches the front end of the bin, however, the extension member engages guide plate 38 and commences to ride along the rear surface of the guide plate, thereby causing the extension member to move transversely of the bin against the bias spring 44. In the case of the use of a double-acting hydraulic ram to bias the extension member relative to the pusher plate, the hydraulic mechanism may be operated in a manner similar to that associated with the structure shown in FIG. 4, for example. In this manner, the pusher plate is moved to the extreme front of the bin and all refuse accumulated in the bin is ejected therefrom.

FIG. 3 shows another refuse collection truck 47 which is like vehicle 10 except to the extent of the differences illustrated in FIG. 3. Vehicle 47 includes a pusher plate 48, similar to pusher plate 39, which is movable back and forth along the elongate extent of the bin by a suitable pusher plate drive mechanism (not shown). Pusher plate 48 is fitted with an extension member 49 which extends from the left vertical edge of the pusher plate toward the left interior wall of the bin. The extension member has a forwardly extending flange 50 of substantial length disposed parallel to the bin left side wall. A double-acting hydraulic ram 41 is coupled between the rear side of the pusher plate and the extension member for powered movement of the extension member transversely of the bin.

Pusher plate 48 is operated for the purposes of ejecting collected refuse from the bin of vehicle 47 in a manner similar to the movement of pusher plate 39 pursuant to the foregoing description. It will be observed, however, that in vehicle 47 no refuse deflection plate 38 is provided rearwardly of cab 25. Accordingly, during the process of loading refuse into the bin, some loose refuse may fill the space immediately to the rear of the cab. In ejecting refuse from the vehicle, pusher plate 48 is moved forwardly of the bin with extension member 49 in its leftmost position relative to the pusher plate until the forward edge of flange 50 abuts the rear wall of the cab. Ram 51 is then operated to move flange 50 to the right, thereby forcing any refuse which may have collected in the area immediately to the rear of the cab toward the bin refuse discharge opening. Thereafter, the pusher plate is moved further forwardly of the bin to expel all refuse from the bin. The forwardmost position of the pusher plate and its extension member is as shown in dashed lines in FIG. 3.

After refuse ejection is completed in vehicle 47, the pusher plate is returned to the rear of the bin and the extension plate member is moved back into engagement with the bin left side wall, thereby assuring that no refuse which may remain in the left front corner of the bin is dragged to the rear of the bin as might happen if the extension member were sooner moved into its normal position. After the extension member has been moved to the left in the bin following a refuse ejection operation, the pusher plate is moved back toward the front of the bin to serve as a backstop for refuse compaction during initial operation of the vehicle on a subsequent refuse collection route.

By locating the vehicle control cab in the left front corner of vehicles 10 and 47, the vehicle may be operated quite readily in a conventional manner on highways to and from refuse collection routes. On a refuse collection route, however, the vehicle normally is driven on the wrong side of the street so that cab 25 is located adjacent the curb. The driver of the vehicle may then operate efficiently to empty refuse receptacles 34 disposed adjacent curb 35 into hopper 33 since the vehicle preferably is stopped in about the position shown in FIG. 1 relative to curbside refuse containers. With the vehicle positioned as shown in FIG. 1, the driver can conveniently alight from cab 25, pick up the refuse receptacles, empty them into hopper 33, and replace the empty receptacles adjacent the curb as he returns to the cab for moving the vehicle to the next refuse collection station. It is within the scope of this invention, however, that the vehicle control cab may be located in the right front corner of the vehicle, the gate assembly being mounted to the left of the cab, if it is desired that the vehicle be operated in the right direction on city streets and the like during operations on a refuse collection route.

Another vehicle 55 according to this invention is illustrated in FIG. 4 and is similar to vehicles 10 and 47 in that it includes an elongate refuse storage bin 56 mounted on a wheeled chassis propelled by engine 57 mounted in a compartment 58 located in the rear of the bin. Compartment 58 is separated from a major refuse collection volume 59 of the bin by a partition 60. The bin has floor 61, left wall 62, right wall 63, and roof 64 interior boundary surfaces. The rear end of the bin is essentially permanently closed by partition 60 and also by the rear wall of engine compartment 58.

A driver's control cab 65 is permanently and fixedly mounted to the chassis of vehicle 55 within the maximum width of the vehicle (defined by bin 56) forwardly of the front end of the bin. As in vehicles 10 and 47, cab 65 closes the left portion of the front end of the bin; the remainder of the bin is open but is closed during operation of the vehicle on a refuse collection route by a gate assembly 66 disposed between the right side of the cab and the right extremity of the vehicle. Gate assembly 66 is mounted to the bin by hinges 67 connected between the gate assembly and the bin along the top front boundary of the bin discharge opening. The lower boundary 68 of the bin discharge opening lies forwardly of the top boundary of the opening as shown in FIG. 4, with the result that the plane of the discharge opening is inclined upwardly and rearwardly, as is common in refuse collection vehicles of the type illustrated in United States Patent 2,879,906, for example.

Gate assembly 66 includes a refuse collection hopper 69 and a transfer mechanism (not shown, but referenced above to prior U.S. patents) for transferring refuse deposited in the hopper to the interior of the bin and for compacting within the bin refuse so transferred.

Cab 65 defines a driver's compartment 70 which lies forwardly of the position occupied by the front end of the gate assembly when the gate assembly is disposed in closure relation to the bin. The driver's compartment includes a seat 71, a steering wheel 72, an accelerator pedal 75, and suitable brake and clutch pedals 76. The left side boundary of compartment 70 is defined by a door 77 which is connected at its rear edge to the cab frame by a hinge 78. The right side of the driver's compartment is closed by a sliding door 78 which is stored rearwardly of the door opening in the cab when this door is open. Both doors 77 and 78 are provided with suitable windows (not shown). To facilitate ready access to seat 71 through either of doors 77 or 78, a transmission control 79 is mounted to the dashboard of the driver's compartment.

A swamper's compartment 80, fitted with a seat 81, is located to the rear of the driver's compartment. Access to the swamper's compartment is provided through the left side thereof by means of a sliding door 82 which is retractable into a storage position to the rear of the swamper's compartment.

A refuse pusher plate 85 is disposed transversely within the bin and extends from top to bottom of the bin and from the bin right side wall toward but not to the bin left side wall. The width of the pusher plate transversely of the bin is slightly less than the width of the bin refuse discharge opening. An extension member 86 for the pusher plate extends from the pusher plate toward the bin left side wall. The width of the extension member transversely of the bin is greater than the width of the bin not spanned by the pusher plate itself, and the vertical extent of the extension member is the same as that of the pusher plate. At its left edge, the extension member has a rear flange 87 extending parallel to the left wall of the bin and a front flange 88 which extends in the plane of flange 87 forwardly of the extension member. The extension member is movably engaged with the pusher plate by means of suitable bearings 89 mounted to the pusher plate adjacent its left edge and by similar bearings 90 carried by the extension member adjacent its right edge.

A pair of extensible hydraulic rams 91 are connected between extension member flange 87 and brackets 92 extending rearwardly of the pusher plate. Rams 91 are disposed in a horizontal attitude and are located adjacent the upper and lower extremities of the pusher plate as shown in FIG. 6.

The pusher plate is driven back and forth along the length of the bin toward and away from the bin refuse discharge opening by a multistage hydraulic ram 93 powered by a suitable hydraulic power mechanism (not shown) disposed in engine compartment 58, which mechanism also provides hydraulic power to rams 91 and to the mechanism coupled between the gate assembly and the chassis for driving the gate assembly into and out of closure relation to the bin refuse discharge opening.

An endless belt 95 is disposed in bin 56 rearwardly of cab 65. The vertical extent of the belt is substantially equal to the distance between the bin floor and roof surfaces. The belt is supported on a plurality of drive wheels 96 secured to a belt drive shaft 97 located in the bin just rearwardly of the right rear corner of cab 65. The belt is further supported by a plurality of drive wheels 98 fixed to and spaced along a vertical drive shaft 99 located in the bin adjacent bin left side walls 62 rearwardly of shaft 97. Belt 95 effectively defines an interior boundary surface of the bin. The belt is maintained under suitable tension between drive wheels 96 and 98 by a tensioning mechanism which includes a plurality of idler wheels 100 mounted to and spaced along a vertical shaft 101 which is biased toward the belt by springs 102. The belt tensioning mechanism preferably is disposed within the triangular volume 104 located just rearwardly of cab 65 as shown in FIG. 5. Access to this volume is provided by a door 103 which is hinged at its rear edge to bin left side wall 62; access to this volume is desired so that any refuse which may be swept into the volume in response to movement of the belt may be removed at the time refuse is ejected from the bin.

Belt 95 preferably is a rubber belt having a fabric reinforcing core. A plurality of fingers 105 are molded into the active surface of the belt and extend normal to the body of the belt so as to project into bin refuse storage volume 59.

With reference to FIG. 6, each of shafts 97 and 99 is supported at the floor and roof of the bin. Below its lower bearing, each shaft carries a chain sprocket 108, the shafts being linked together by a chain 109 looped over the sprockets. Adjacent its sprocket, shaft 97 carries a gear 110 which is engaged with a pinion gear 111 connected to a belt drive motor 112 located below bin 56 and mounted to the chassis of the vehicle. Operation of motor 112, which may be a hydraulic or an electrical motor, rotates shafts 97 and 99 in tandem to drive belt 95. Motor 112 preferably is a reversible motor.

The belt and the pusher plate extension member shown in FIG. 6 actually are modifications of the structure shown in FIG. 4. In FIG. 6, there is illustrated a pusher plate extension member 114 which does not have a forwardly extending flange like flange 88 of pusher plate extension member 86. The edge of pusher plate extension member 114 which cooperates with bin left side wall 62 is recessed, as at 115, to cooperate with fingers 105 of belt 95, as shown in FIG. 6.

FIG. 6 also illustrates that the pusher plate extension member preferably carries a roller 116 along its upper and lower edges, which rollers cooperate with tracks 117 formed in the roof and floor surfaces of the bin to assure that the pusher plate extension member moves transversely of the length of the bin in a predetermined manner as the pusher plate itself is moved back and forth along the bin. In FIG. 4, the path of tracks 117 is represented by dashed line 118.

The operation of drive rams 91 for pusher plate extension members 86 or 114 is controlled by a mechanism which is illustrated in FIGS. 7 and 8 and which includes a cable 120 secured to pusher plate 85 as illustrated in FIG. 4. Cable 120 extends from the pusher plate to a drum 121 which preferably is located within partition 60. Drum 121 defines a helical groove 122 in the surface thereof within which cable 120 is laid as the cable is taken in or paid out from the drum. The provision of groove 122 assures that the effective diameter of the drum is always a predetermined diameter. Rotation of the drum in a direction which results in the cable being paid out from the drum is against the bias of a rewind mechanism 123 mounted to a fixed element of the vehicle structure and to which the drum is coupled. A drive screw 124 extends axially of the drum and carries a control cam 125. The cam is mounted so that it moves axially of the screw as the screw is rotated in response to movement of the pusher plate.

As shown in FIG. 8, the cam preferably is provided in the form of a sleeve engaged circumferentially of a carrier 126. The carrier has internal threads which cooperate with the threads of drive screw 124. The carrier is secured from angular movement about the axis of the drive screw by means of a pin 127 passed through the carrier parallel to the drive screw and along which the carrier moves in response to the rotation of the drive screw. The cam sleeve is adjustably held in position along the exterior of the carrier by a set screw 128.

Cam 125 cooperates with the cam followers 130 which are mounted to the actuating members of an IN switch 131 and an OUT switch 132, respectively. Switches 131 and 132 are connected to a solenoid valve 133 which has its outlet ports connected by suitable hydraulic ducting to the hydraulic fluid supply and return ports of double-acting rams 91. The solenoid valve is a portion of a hydraulic power circuit for rams 91, which circuit includes a reservoir 134, a pump 135 driven by a motor 136, a pressure relief valve 137, a fluid supply duct 138 extending between the relief valve and the solenoid valve, and a fluid return duct 139 connected between the solenoid valve and reservoir 134.

Assume that pressure plate 85 is disposed at its rearwardmost limit of travel lengthwise of bin 56 and that it is desired to eject refuse from the bin. Ram 93, for example, is operated to drive the pusher plate forwardly of the bin. As the pusher plate moves forward, cable 120 causes drum 121 to rotate against the bias imposed thereon by rewind mechanism 123. Such rotation of the drum causes cam 125 to be driven along drive screw 124 relative to IN switch 131 and OUT switch 132. As the forward edge of pusher plate extension member flange 88 approaches the rear extent of belt 95 along the path represented by dashed line 140 in FIG. 5, the switches are operated so as to cause solenoid valve 133 to be operated to supply hydraulic fluid to ram 91 in such a manner that ram 91 is retracted at a rate which, when combined with the rate of advance of the pusher plate along the bin, causes the leading edge of flange 88 to follow along path 140. Path 140 is disposed so that the leading edge of the pusher plate cooperates closely with fingers 105 of belt 95. Belt drive motor 112 is placed into operation at the same time that ram 93 is operated to cause the belt to rotate to sweep collected refuse lying adjacent the belt toward the bin refuse discharge opening. Accordingly, the pusher plate may be moved in an essentially continuous manner from the rear end of the bin to the discharge opening to discharge refuse collected and stored within the bin.

When it is desired to move the pusher plate rearwardly from the forward end of the bin, cable 120 is rewound upon drum 121 by operation of mechanism 123. During rearward movement of the pusher plate, the operation of rams 91 is controlled by coaction between cam 125 and switches 131 and 132 in a manner reversed from that described above.

The drive mechanism for pusher plate drive ram 93 and belt drive motor 112 are interconnected so that during movement of the pusher plate from the front to the rear of the bin, belt 95 is driven in a direction opposite to the direction in which it is driven during a refuse ejection sequence. Accordingly, as refuse is transferred into bin 56 from hopper 69 during operations of the vehicle on a refuse collection route, belt 95 operates to sweep refuse introduced into the bin into that portion of volume 59 which lies to the rear of cab 65.

Belt 95, therefore, serves to compact refuse within the bin as well as to assist in the ejection of refuse from the bin.

FIG. 9 illustrates another belt 144 which may be used to advantage in a refuse collection vehicle according to this invention. The active surface, i.e., the surface of the belt which cooperates with refuse disposed in the bin, is vertically corrugated to define a plurality of ribs 145 (see FIG. 11). The ribs extend along the entire vertical extent of the belt and frictionally and mechanically coact with refuse in the bin either to assist in ejecting refuse from the bin or in compacting refuse within the bin, depending upon the direction in which the belt is moved. The rear surface of the belt defines a plurality of ribs 146 which extend along the length of the belt parallel to each other in groups spaced along the width of the belt at locations corresponding to the location of the drive wheels 96 and 98 along shafts 97 and 99, respectively. Ribs 146, like ribs 145, are molded integral with the belt and, as shown in FIG. 10, have cross-sections resembling V-belts. Ribs 146 cooperate within correspondingly configured grooves 147 provided circumferentially of each of belt drive wheels 96 and 98. The cooperating configurations of belt 144 and the drive wheels therefor, shown in FIG. 10, result in a most efficient belt drive mechanism, which mechanism functions equally well whether operated in forward or reverse modes.

FIG. 12 shows another belt 150 which may also be used to advantage in this invention. The active surface of belt 150 defines a plurality of short, vertical ribs 151 arranged staggered relative to each other, as shown in FIG. 12 to enhance the frictional cooperation of the belt with refuse disposed adjacent the belt. Like belt 144, belt 150 includes ribs 146 along its back surface for cooperation with drive wheels like those illustrated in FIG. 10.

The arrangement of control cab 65 relative to gate assembly 66, as shown in FIG. 4, means that vehicle 55 may be used efficiently on a refuse collection route regardless of whether the vehicle is operated on the wrong or the right side of the street. When the vehicle is operated on the wrong side of the street, the drive may function in accord with the foregoing description presented relative to FIG. 1. Where the vehicle is operated on the right side of the street, the driver may alight from the vehicle through door 78 to pick up refuse receptacles deposited at curbside, empty the receptacles into the refuse hopper, replace the emptied receptacles adjacent curbside, and return directly to the control cab, and thereby perform the necessary manual operations in a most efficient manner.

The structures described above provide refuse collection vehicles which are improved in terms of efficiency of use and in terms of refuse ejection and compaction. These vehicles may be operated effectively by a crew of one man, but provision is made for crews of two or more men where such is desired.

What is claimed is:

1. A refuse collection vehicle comprising a self-propelled wheeled chassis, a refuse collection bin mounted to the chassis for defining essentially the maximum width of the vehicle and having opposite ends one of which is effectively permanently closed, a vehicle control cab fixedly mounted to the chassis adjacent the other end of the bin proximate one side of the vehicle and partially closing said other end of the bin, a gate assembly mounted adjacent the control cab for movement relative to the bin into and out of closure relation to the remainder of said other end of the bin, the gate assembly including a refuse collection hopper and means for transferring to the bin refuse introduced into the hopper.

2. A vehicle according to claim 1 wherein the control cab is located essentially within the width of the vehicle, and including a refuse guide plate in the bin in line with the control cab, the guide plate extending from the bottom to the top of the bin and from said one side wall of the bin at a location spaced along the length of the bin from the cab to the limit of the cab adjacent the bin and the gate assembly.

3. A vehicle according to claim 2 including a refuse pusher plate disposed in the bin extending from the bottom to the top of the bin and from the bin other side toward but not to the bin one side, means for moving the pusher plate along the bin toward and away from the bin other end for ejecting refuse collected in the bin through the portion of the bin other end closable by the gate assembly, extension means mounted to the pusher plate extending between the pusher plate and the bin one side, and means mounting the extension means to the pusher plate for movement of the extension means relative to the pusher plate transversely of the bin.

4. A vehicle according to claim 3 including means coupled between the pusher plate and the extension means biasing the extension means toward the bin one side.

5. A vehicle according to claim 3 including means coupled between the pusher plate and the extension means for driving the extension means toward and away from the bin one side.

6. A vehicle according to claim 1 wherein the control cab is located essentially within the width of the vehicle, and including a refuse pusher plate in the bin extending from the bottom to the top of the bin and from the bin other side toward but not to the bin one side, extension means mounted to the pusher plate for movement relative thereto transversely of the bin and extending between the pusher plate and the bin one side, drive means coupled to the pusher plate for moving the pusher plate along the bin toward and away from the bin other end for ejecting refuse collected in the bin through the portion of the bin other end closable by the gate assembly.

7. A vehicle according to claim 6 including a flange extending from the extension means toward the control cab along substantially the entire vertical extent of the limit of the extension means which is adjacent the bin one side, and power means coupled between the pusher plate and the extension means for moving the extension means toward and away from the bin one side.

8. A vehicle according to claim 6 including power means coupled between the extension means and the pusher plate for moving the extension means toward and away from the bin one side, and means for controlling operation of the power means in response to movement of the pusher plate along the bin.

9. A vehicle according to claim 8 wherein the control means is arranged to cause the limit of the extension means disposed adjacent the bin one side to follow a selected path as the pusher plate moves along the bin.

10. A vehicle according to claim 6 including an endless belt disposed in the bin adjacent the other end thereof and adjacent the cab and having a width substantially equal to the height of the bin, the belt defining an interior boundary surface of the bin extending substantially from the limit of the cab adjacent the bin and the gate assembly to a location of the bin one side spaced along the bin from the cab, and means for driving the belt for moving refuse engaged therewith.

11. A vehicle according to claim 10 wherein the belt drive means is reversible.

12. A vehicle according to claim 11 wherein the belt drive means and the pusher plate drive means are interrelated so that the belt is driven to move refuse engaged therewith toward said portion of the bin other end when the pusher plate is moved toward the bin other end, and the belt is driven in the reverse direction when the pusher plate is moved away from the bin other end.

13. A vehicle according to claim 10 wherein the surface of the belt carries friction enhancing means for cooperation with refuse engaged with the belt.

14. A vehicle according to claim 13 wherein the friction enhancing means comprise a plurality of fingers extending from the belt.

15. A vehicle according to claim 13 wherein the friction enhancing means comprise a plurality of vertical corrugations defined in the surface of the belt.

16. A vehicle according to claim 1 wherein the cab extends farther longitudinally of the vehicle away from the other end of the bin than does the gate assembly when disposed in closure relation to the bin, a driver's compartment defined in the portion of the cab which extends from the bin other end beyond the closure position of the gate assembly, and a door into the compartment from each side thereof.

17. A refuse collection vehicle comprising a self-propelled wheeled chassis, a refuse collection bin mounted to the chassis and having forward and rear ends and interior effective boundary surfaces including a floor and side walls, a vehicle control cab mounted to the chassis adjacent the forward end of the bin and partially closing the forward end of the bin, a refuse collection hopper assembly mounted adjacent the control cab for closing the remainder of the forward end of the bin and including means for transferring refuse from the hopper into the bin, means for ejecting from the bin refuse collected in the bin, the cab extending farther forwardly of the vehicle than the hopper assembly and defining an operator's compartment therein forwardly of the hopper assembly, and a doorway through each side of the cab into the operator's compartment.

18. A refuse collection vehicle comprising a self-propelled wheeled chassis, a refuse collection bin mounted to the chassis and having opposite ends and interior effective boundary surfaces including a floor and side walls, a vehicle control cab fixedly mounted to the chassis adjacent one end of the bin and partially closing the one end of the bin, a refuse collection hopper assembly mounted adjacent the control cab for closing the remainder of the one end of the bin and including means for transferring refuse from the hopper into the bin, and means for ejecting from the bin refuse collected in the bin, the ejecting means including a movable belt defining at least a part of one of the interior boundary surfaces of the bin.

19. A vehicle according to claim 18 wherein the hopper assembly is mounted for movement into and out of closure relation to the remainder of the bin one end, and the belt is disposed next adjacent the cab in the bin to define a vertical interior boundary surface of the bin extending substantially from the edge of the remainder portion of the bin proximate the cab at an angle to the length of the vehicle substantially to a longitudinal side wall of the bin.

20. A vehicle according to claim 19 including reversible means for driving the belt, the belt when moving in one direction comprising a portion of the refuse ejecting means and comprising a portion of means for compacting refuse in the bin when moving in an opposite direction.

References Cited
UNITED STATES PATENTS 3,006,492  10/1961  Haughton _____ 214—82 XR ALBERT J. MAKAY, Primary Examiner U.S. Cl. X.R.

214—82, 83.3